United States Patent [19]

Mainenti

[11] Patent Number: 4,495,709
[45] Date of Patent: Jan. 29, 1985

[54] SNAP-ON ADAPTOR FOR ARCHITECT'S SCALE

[76] Inventor: Joseph S. Mainenti, 16 Lilro Ct., Wayne, N.J. 07470

[21] Appl. No.: 439,338

[22] Filed: Nov. 5, 1982

[51] Int. Cl.³ .......................... G01B 3/04; B43L 7/00
[52] U.S. Cl. .......................................... 33/484; 33/485
[58] Field of Search ................. 33/483, 484, 485, 489, 33/491

[56] References Cited

U.S. PATENT DOCUMENTS

| 146,673 | 1/1874 | Haslett | 33/483 |
| 1,773,899 | 8/1930 | Kaler | 33/485 |
| 2,365,735 | 12/1944 | Ware | 33/489 |
| 2,382,758 | 8/1945 | Weeks et al. | 33/107 |
| 2,423,779 | 7/1947 | Kahn | 33/485 |
| 2,504,251 | 4/1950 | Coffey | 33/107 |
| 3,087,250 | 4/1963 | Blue | 33/484 |
| 3,310,878 | 3/1967 | Giba | 33/107 |

FOREIGN PATENT DOCUMENTS

| 121946 | 3/1931 | Austria | 33/483 |
| 459836 | 10/1950 | Italy | 33/485 |

Primary Examiner—Richard R. Stearns
Attorney, Agent, or Firm—Siegmar Silber

[57] ABSTRACT

An easily attachable or removable snap-on adapter to triangular scales provides supplemental length-measuring scales, besides serving as a guard against accidental use of an inappropriate scale. It also acts as an aid for correctly orienting and accurately and firmly positioning the ruler for measurement or drafting purposes. It is made preferably of a molded plastic piece, whose inner contour comprises two elongated beads fitting snugly into each of two grooves along two sides of a standard triangular scale, and whose contour comprises a flap beneath each of these beads and a substantially flat, but flexible portion above the beads. When in use, the part of the inner contour which is directly opposite this flat portion is designed to rest on the upper edge of the scale. The adapter may have imprinted one or two scales, preferably color-coded, near one or both of the outside edges of one or both of the flaps, in which case it serves as a supplementary snap-on scale covering up and replacing the scales of the ruler. Alternatively, one of the flaps may be narrower than the corresponding side of the ruler, so that a selected scale of the ruler can remain exposed while the other scales remain covered up, in which case the adapter serves as a guard preventing accidental use of the covered scales.

9 Claims, 12 Drawing Figures

SNAP-ON ADAPTOR FOR ARCHITECT'S SCALE

BACKGROUND OF THE INVENTION

1. Field of the Invention

This invention pertains to a snap-on adaptor to standard triangular measuring rulers, such as those commonly used by architects, engineers, draftsmen, and persons in similar or related professions. Such adaptors can provide a variety of supplementary changeable scales and/or serve as ruler guards.

2. Description of the Prior Art

A search of the prior art relating to the present invention was performed in Class 33, subclasses 483 and 484 and Digest 16. Files of foreign patents corresponding to the listed class, subclasses, and digest also have been reviewed.

The search uncovered five U.S. patents (No. 3,310,878 of Mar. 28, 1967 to J. E. Giba; No. 2,504,251 of Apr. 18, 1950 to E. W. Coffey; No. 2,382,758 of Aug. 14, 1945 to W. D. Weeks and L. Kube; No. 564,342 of July 21, 1896 to L. K. Sherman; and No. 146,673 of Jan. 30, 1874 to S. Haslett) and Austrian Pat. No. 121,946 of Mar. 25, 1931 to H. Judtmann.

The Judtmann patent discloses a triangular non-transparent sheath of metallic or plastic material fitting over a triangular ruler and having one of its sides partly cut out or provided with a window to permit reading of only one selected scale, thereby preventing accidental use of an inappropriate scale. The angle of the sheath opposite said opening or window may be made smaller than the angles of the triangular rule, thereby causing the sides of the sheath to exert sufficient pressure on the ruler to prevent slippage.

The Haslett patent discloses an adjustable guard, made of metal, hard rubber, or other suitable material which can be fitted to a ruler by elastic pressure. The guard has two unequal sides, with a protruding part between these sides serving as a handle and preventing the ruler from being laid down the wrong way. The shorter of the two sides leaves the numerals of the selected scale exposed, whereas the longer side covers all the numerals, thereby again preventing accidental use of a wrong scale.

A guard similar to that of Haslett, but without the protruding part, and extending throughout the length of the graduated scales, is disclosed by Coffey. Its purpose is the same as that of Haslett or Judtmann.

Sherman's patent discloses an attachment to triangular rulers which serves to prick the measured points.

The device of Weeks et al. is for forming triangular rules out of a plurality of blades having a variety of graduated scales thereon.

Giba's patent discloses a slotted plate which can be attached by spring clips to a triangular rule for drafting purposes.

None of the cited patents disclose means for attaching a variety of adaptable scales to a traingular scale. Neither do any of these patents disclose a substantially flat upper part pressing against the upper edge of the ruler so as to provide a stable and comfortable rest cap for the palm of the hand.

SUMMARY OF THE INVENTION

It is an object of this invention to provide a guard for triangular rulers which will block out unwanted scales so as to avoid confusion and accidental errors.

It is another object of this invention to provide a ruler guard which will help to orient the scale correctly for quick and effective use.

It is still another object of this invention to provide a guard which will permit pressing the scale with the palm of the hand against a substantially flat surface for firm and accurate positioning during measuring or drafting work.

It is yet another object of this invention to provide a ruler guard that is easily removable and replaceable.

It is a further object of this invention to provide additional scales which can be adapted to a triangular scale for the purpose of augmenting the number of different types of measurements which can be performed with a single scale.

It is still a further object of this invention to provide snap-on guards or scales which are simple and economical to produce.

Briefly, my invention consists of an adapter made preferably of molded plastic material, whose inner contour comprises two elongated beads fitting snugly into each of two grooves along two sides of a standard triangular ruler, and whose outer contour comprises two flaps and a substantially flat but flexible upper portion. When in use, the part of the inner contour directly beneath this flat portion is designed to rest on the upper edge of the ruler. The adapter may be provided with one or two scales preferably color-coded, near one or both of the outside edges of the flaps, in which case it serves a snap-on scale covering up and replacing the scales of the ruler. Alternatively, one of the flaps may be narrower than the corresponding width of the ruler, thereby exposing one of the original scales on the ruler, in which case it serves as a guard preventing accidental use of an inappropriate scale.

BRIEF DESCRIPTION OF THE DRAWINGS

My invention may be best explaind with reference to the drawings, in which.

DESCRIPTION OF THE PREFERRED EMBODIMENTS

Figure 1:
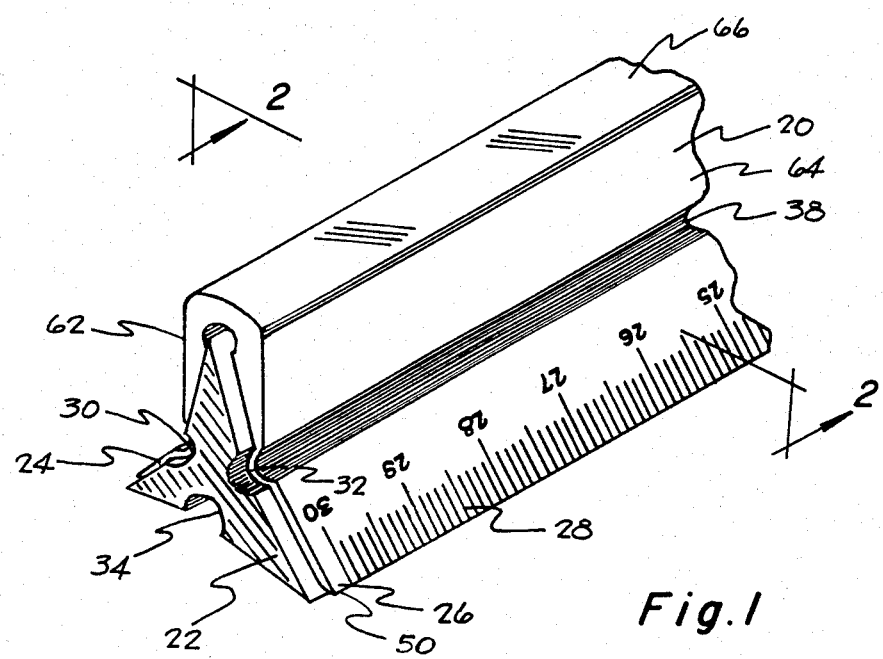
FIG. 1 is a perspective view of an adapter of this invention snapped onto a triangular scale.
Figure 3A:
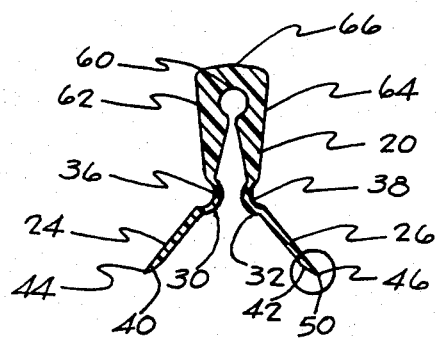
FIG. 3A is similar to the section view of FIG. 2, but showing the adapter thereof after its removal from the ruler.
Figure 3B:
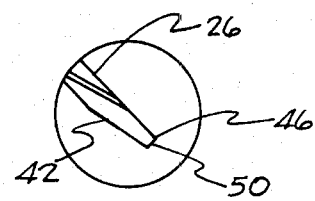
FIG. 3B is a detailed section view of a portion of FIG. 3A.
Figure 2:
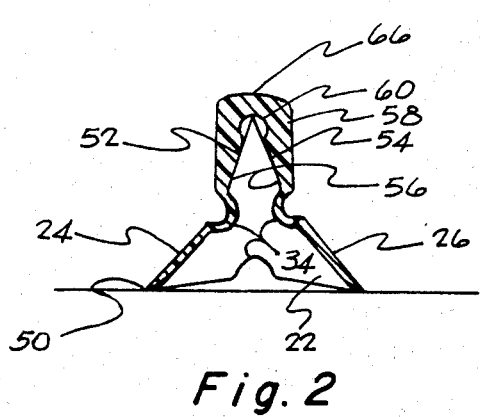
FIG. 2 is a view along section 2—2 of FIG. 1.

In a preferred embodiment shown in FIGS. 1, 2, 3A, and 3B, an adapter 20 is structured to snap on and completely cover the scales of a standard triangular ruler 22, which may be made of plastic, wood or metal. Adapter 20 has two flaps 24 and 26, one or each of which may have one or two overlapping graduations 28 corresponding to different measuring units or ratios. These flaps are made of a material which is hard enough and of sufficient thickness to be amenable to being indented, and the printing of graduations, numbers, units or ratios. Extending along the length of adapter 20 are two inner indenture beads 30 and 32 each of which fits into any one of the central grooves 34 of ruler 22.

When beads 30 and 32 are pressed into any two of the three grooves 34 of the ruler, they snap into these grooves and hold adapter 20 firmly against ruler 22 by elastic tension. Beads 30 and 32 are preferably made undersized to assure a good fit to grooves of various sizes.

Opposite each inner indenture bead 30 and 32 is an outer indenture 36 and 38 designed to allow flexing of flaps 24 and 26 so that they conform to the curvature of the ruler 22, whether concave or flat.

The outer edge 40 and 42 of each of the flaps 24 and 26 is preferably tapered on the underside so as to rest smoothly on a drawing surface. The upper outer side of each terminates preferably at a square corner 44 and 46 which allows graduations to be printed to the upper edge of the flap. One or both of the outer edges 40 and 42 may also terminate with a square corner 48 and 50 which facilitates the marking off of increments by providing a rest for a pencil point.

Above each inner indenture bead 30 and 32 is an inner tapered surface 52 and 54 which at the innermost portion conforms snugly to the angle 56 of ruler 22 so as to prevent any slippage or side movement of the upper section 58 of adapter 20. At the uppermost portion, the inner tapered surfaces 52 and 54 are constructed as somewhat relieved so as to avoid abrading the scale markings. Because of the geometry of the adapter, the relieving of the uppermost portion does not affect the stability of the scale and adapter combination. Each tapered surface 52 and 54 terminates at an upper circular groove 60 which runs the full length of adapter 20 and serves to permit flexing of upper section 58 so as to cause the inner tapered surfaces 52 and 54 to conform to the surfaces of ruler 22.

The upper section 58 with its sides 62 and 64 runs the full length of adapter 20 and provides a convenient handle and grip for fitting the adapter over ruler 22, for lifting the adapter with the ruler from a drawings surface, and for positioning ruler 22 with the proper side up. Upper section 58 also provides a smooth surface for the palm of the hand to rest during marking of increments (as opposed to the sharp pointed upper edge of the triangular ruler), and it also serves as a finger grip for easy removal of adapter 20 from ruler 22. Its upper surface 66 may be slightly convex with rounded corners, whereas its sides 62 and 64 are preferably either flat and tapered inward or somewhat concave so as not to obstruct the line of sight of the gradutions as viewed from above.

A plurality of the afore-described adaptors may be provided in form of color-coded kits to supplement the scales imprinted on a triangular ruler or to render such a ruler less conducive to accidental error by eliminating or reducing the number of unneeded scales.

In the description of the embodiments which follow, the embodiments are described in a manner parallel to that of the preferred embodiment described hereinabove; however, in the following reference designators for similar parts are indicated as "100" units higher in the second embodiment and "200" units higher in the third embodiment. Thus the basic ruler 22 has a corresponding elements 122 and 222 in the second and third embodiments, respectively.

Figure 4:
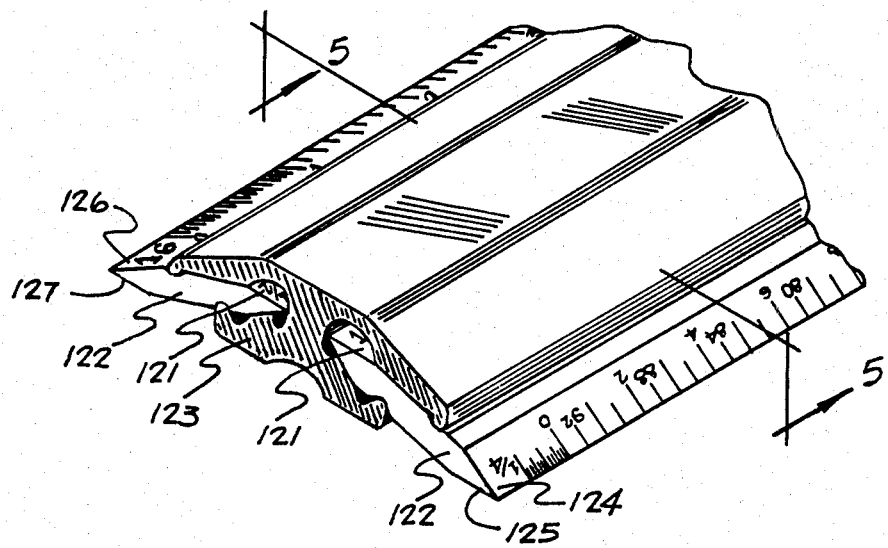
FIG. 4 is a perspective view of a second embodiment of this invention.
Figure 6:
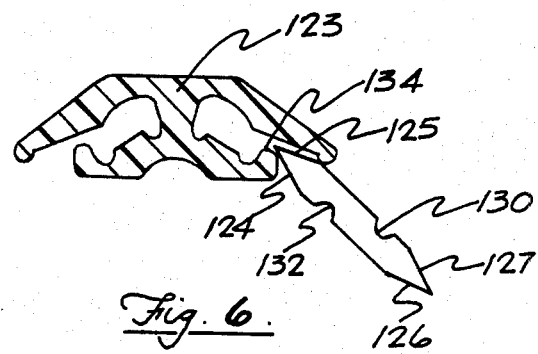
FIG. 6 is similar to the sectional view of FIG. 5, but showing the adapter thereof removed from the base.
Figure 5:
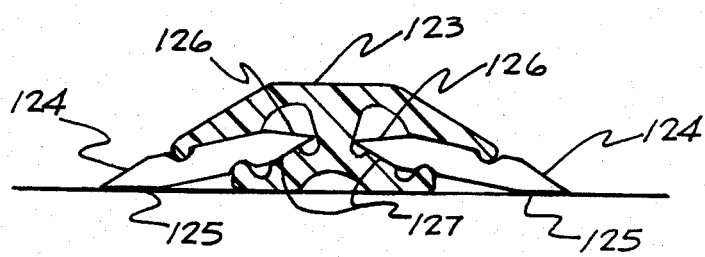
FIG. 5 is a view along section 5—5 of FIG. 4.

Referring now to FIGS. 4, 5 and 6 a second embodiment is shown. An adapter or scale blade 120 is structured to snap into and completely cover the unused scale 121 of the adapter. The adapter, which may be made of plastic, wood or metal fits into scale holder 123. Adapter 120 has four scale faces 124 125, 126 and 127 one or each of which may have one or two overlapping graduations 128 corresponding to different measuring units or ratio. These scale faces are made of a material which is suitable for and of sufficient thickness for engraving, etching and receiving indented printing or other marking process with graduations, numbers, units or ratios. Extending along the length of adapter 120 are two indented portions 130 and 132 each of which fits onto any one of the longitudinal beads 134 of scale holder 123.

When indented portions 130 and 132 are pressed into any one of the two longitudinal openings of the sale holder 123, the beads 134 snap into these indentions and hold adapter 120 firmly against scale holder 123 by elastic tension. Beads 134 are preferably made undersized to assure a good fit to grooves for various sizes.

Figure 7:
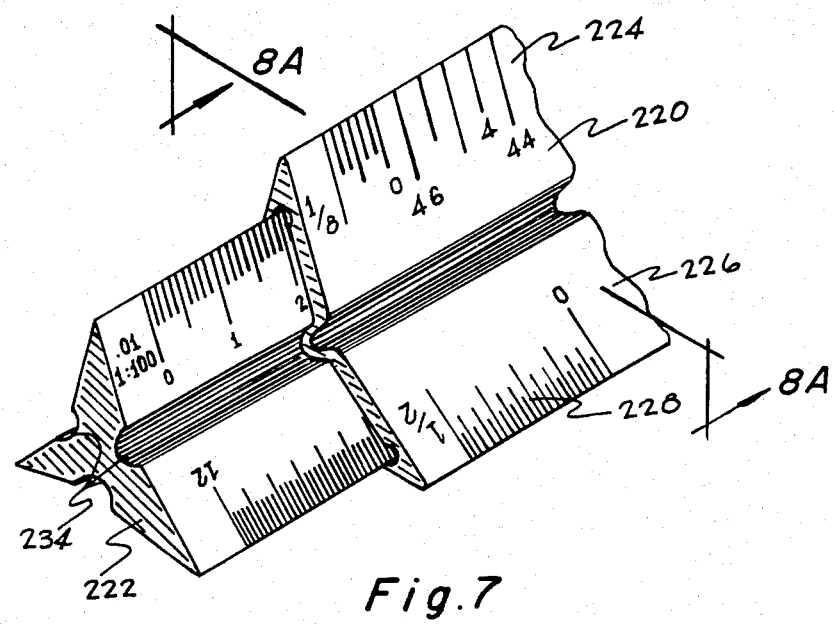
FIG. 7 is a perspective view of a third embodiment of the invention.
Figure 9:
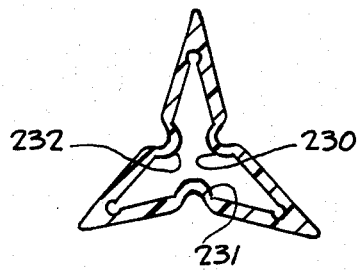
FIG. 9 is a view similar to the sectional view of FIG. 8, but showing the adapter thereof removed from the triangular scale; and, FIG. 10 is a side elevational view of the scale and adaptor of FIG. 7 and shows the relationship therebetween for operational facility.
Figure 8A:
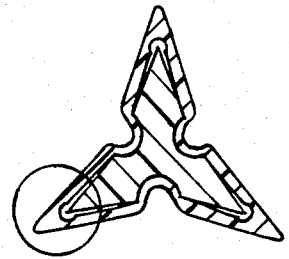
FIG. 8A is a view along section 8—8 of FIG. 7.
Figure 8B:
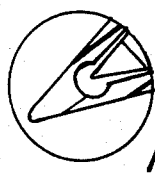
FIG. 8B is an enlarged view of one corner of FIG. 8A to illustrate the protected scale areas.
Figure 10:
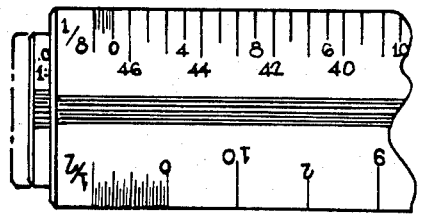

In a third embodiment shown in FIGS. 7, 8A, 8B, 9 and 10, an adapter 220 is structured to snap on and completely cover the scales of a standard triangular ruler 222, which may be made of plastic, wood or metal. Adapter 220 has six scale sections of which sections 224 and 226 are shown in FIG. 7. Of these, one of which may have one or two overlapping graduations 228 corresponding to different measuring units or ratio. These sections are made of a material which is hard enough and of sufficient thickness to be etched, engraved or prepared with graduations, numbers, units or ratios as in the preferred embodiment hereinabove. The material may also be formed so that slight tension exists pulling the adapter structure inwardly. The end area of adapter 220 may be slightly flared to facilitate the emplacement of the triangular ruler 222 therewithin. Extending along the length of adapter 220 are three inner indenture beads 230, 231 and 232 each of which fits into any one of the central grooves 234 of ruler 222.

When beads 230, 231 and 232 are pressed into the three grooves in the central portion of the ruler, the beads are held within the grooves and the adapter 220 firmly against ruler 222 by elastic tension. Beads 230, 231 and 232 are preferably made undersized to assure a good fit to grooves of various sizes.

Other details of construction of the second and third embodiments are similar to the details of the construction of the first embodiment and are included herein without exhaustive repetition. Although this general caveat is used, the relief of the inner support faces to avoid contact with the scale markings is present in all three embodiments. Also, in the second and third embodiments, a plurality of the afore-described adapters may be provided in form of color-coded kits to supplement the scales imprinted on a triangular ruler or to render such a ruler less conducive to accidental error by eliminating or reducing the number of unneeded scales.

There will now be obvious to persons skilled in the art many variations and modifications of the afore-disclosed embodiments, which will remain within the scope of my invention if defined by the following claims.

I claim:

1. An adapter to a triangular ruler having three sides and a central groove along each of said sides, said adapter comprising:
   two parallel outer edges of nearly the same or a slightly shorter length than the length of said ruler;
   an inner contour surface extending inward from one of said outer edges and terminating at the second edge;
   an outer surface extending outward from one of said edges and terminating at the second edge;
   two elongated beads on said inner contour surface, each of said beads being adaptable to be snapped into one of said central grooves so as to hold said adapter firmly against ruler;
   outer indentures on said outer surface opposite and parallel to each of said beads;
   a flap between each of said edges and each of said outer indentures on the outer surface, the inner surface of each of said flaps extending from one of said edges to one of said beads;
   a substantially smooth and substantially flat portion on said outer surface midway between said outer indentures; and
   a circular inner groove within said inner contour surface parallel to and midway between said beads and directly opposite said flat portion, the distance between said inner groove and said beads being separated by substantially flat sections tapered at approximately the same angles of said triangular ruler and being such that the deepest portion of said inner groove abuts an edge of said ruler when said beads are snapped into said central grooves.

2. The adapter of claim 1, wherein the width of one or each of said flaps is such that the flap extends to an edge of said triangular ruler when said beads are snapped into two central grooves of said ruler.

3. The adapter of claim 2, wherein one or both of said flaps has one or two graduated scales on its outer surface.

4. The adapter of claim 3, wherein each of said graduated scales is color-coded.

5. The adapter of claim 3 wherein either flap is of width large enough to enable the associated edge to contact the drawing surface and, wherein at least one of said outer edges is tapered on the underside so as to rest smoothly on a drawing surface when said beads are snapped into said central grooves and said ruler is placed on said drawing surface.

6. The adapter of claim 5, wherein said tapered outer edge terminates with a square corner, so as to provide a rest for a pencil point.

7. An adapter to a triangular ruler having three sides and a central groove along each of said sides, said adapter comprising:
   two parallel outer edges of nearly the same or a slightly shorter length than the length of said ruler;
   an inner contour surface extending inward from one of said outer edges and terminating at the second edge;
   an outer surface extending outward from one of said edges one of which is tapered on the underside so as to rest smoothly on a drawing surface and terminating at the second edge;
   two elongated beads on said inner contour surface, each of said beads being adaptable to be snapped into one of said central grooves so as to hold said adapter firmly against ruler;
   outer indentures on said outer surface opposite and parallel to each of said beads;
   a flap having one or two graduated scales on it's outer surface between each of said edges and each of said outer indentures on the outer surface, said flap extending to an edge of said triangular ruler when said beads are into two central grooves of said ruler, and wherein said flap is of a width to contact the drawing surface and, the inner surface of each of said flaps extending from one said edges to one of said beads;
   a substantially smooth and substantially flat portion on said outer surface midway between said outer indentures; and
   a circular inner groove within said inner contour surface parallel to and midway between said beads and directly opposite said flat portion, the distance between said inner groove and said beads being separated by substantially flat sections tapered at approximately the same angle as the angles of said triangular ruler and being such that the deepest portion of said inner groove will press against an edge of said ruler when said beads are snapped into said central grooves.

8. The adapter of claim 7, wherein each of said graduated scales is color-coded.

9. The adapter of claim 7, wherein said tapered outer edge terminates with a square corner, so as to provide a rest for a pencil point.

* * * * *